(12) United States Patent
Pingree

(10) Patent No.: US 10,116,017 B2
(45) Date of Patent: Oct. 30, 2018

(54) PASSIVE THERMAL MANAGEMENT SYSTEM FOR BATTERY

(71) Applicant: Amazon Technologies, Inc., Seattle, WA (US)

(72) Inventor: Liam Stewart Cavanaugh Pingree, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 191 days.

(21) Appl. No.: 14/975,253

(22) Filed: Dec. 18, 2015

(65) Prior Publication Data

US 2017/0179554 A1    Jun. 22, 2017

(51) Int. Cl.
| | |
|---|---|
| *H01M 6/42* | (2006.01) |
| *H01M 10/655* | (2014.01) |
| *H01M 10/6555* | (2014.01) |
| *H01M 10/625* | (2014.01) |
| *H01M 10/0525* | (2010.01) |
| *H01M 2/34* | (2006.01) |
| *H01M 10/653* | (2014.01) |
| *H01M 10/654* | (2014.01) |
| *H01M 10/613* | (2014.01) |

(52) U.S. Cl.
CPC ....... *H01M 10/6555* (2015.04); *H01M 2/348* (2013.01); *H01M 10/0525* (2013.01); *H01M 10/613* (2015.04); *H01M 10/625* (2015.04); *H01M 10/653* (2015.04); *H01M 10/654* (2015.04); *H01M 2220/10* (2013.01); *H01M 2220/20* (2013.01)

(58) Field of Classification Search
CPC .................................................. H01M 10/50
See application file for complete search history.

(56) References Cited

U.S. PATENT DOCUMENTS

| | | | |
|---|---|---|---|
| 4,483,908 A | 11/1984 | Zimmerman | |
| 2010/0075213 A1* | 3/2010 | Mehta | H01M 2/0257 429/120 |
| 2010/0075221 A1 | 3/2010 | Mehta et al. | |
| 2010/0136404 A1* | 6/2010 | Hermann | H01M 2/1016 429/120 |
| 2011/0300431 A1 | 12/2011 | Smith et al. | |

OTHER PUBLICATIONS

PCT/US16/066389, International Search Report and Written Opinion, dated Mar. 15, 2017, 13 pages.

* cited by examiner

*Primary Examiner* — Olatunji A Godo
*Assistant Examiner* — Julian Anthony
(74) *Attorney, Agent, or Firm* — Kilpatrick Townsend & Stockton LLP

(57) ABSTRACT

A battery module includes one or more battery cells and one or more laminated elements configured to provide passive management of heat generated by the one or more battery cells. Each laminated element includes one or more heat conducting layers and one or more intumescent layers. The one or more intumescent layers are configured to expand in response to an intumescent layer temperature exceedance to reconfigure the laminated element from a first configuration in which the laminated element transfers heat emitted by the one or more battery cells to a second configuration in which the laminated element does not substantially transfer heat emitted by the one or more battery cells.

19 Claims, 6 Drawing Sheets

PASSIVE THERMAL MANAGEMENT SYSTEM FOR BATTERY

BACKGROUND

Battery powered devices are becoming increasingly common. In many applications, the size and/or weight of the battery used to power the device is preferably as small as possible with respect to the power required by the device. Additionally, it is preferable that the battery have a long life that accommodates a high number of discharge/charge cycles. For example, because lithium ion (Li-ion) batteries have a high specific energy and have a favorable aging characteristics relative to lead acid batteries and nickel metal hydride batteries, Li-ion batteries are in wide use in portable electronics (e.g., cell phones, portable computers, etc.). The use of Li-ion batteries in electric vehicles is also increasing.

High specific energy batteries, however, may be susceptible to catastrophic thermal runaway. Thermal runaway may be triggered via conditions such as overcharge, over-discharge, and/or internal short circuits, which may cause an internal temperature of the battery to significantly exceed a safe temperature limit. Above a critical temperature, exothermic reactions can occur that cause further temperature increase, which may result in additional exothermic reactions leading to thermal runaway. A thermal runaway can be a significant safety issue. For example, with a Li-ion battery, temperatures as high as 900° C. may occur as well as the release of a substantial amount of flammable and toxic gas.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Components, assemblies, and related approaches described herein passively accomplish thermal management in a battery. In many embodiments, at least one laminated element is configured to: (1) conduct heat away from one or more battery cells during normal operational conditions, and (2) reconfigure into a non-heat conducting configuration when exposed to temperatures indicative of thermal runaway of the one or more battery cells. By incorporating at least one of the laminated elements into a battery module, heat generated by the battery module can be transferred from the one or more battery cells to exterior to the battery module during normal operation without having to employ active cooling elements (e.g., fans, coolant pumps). Additionally, because the laminated element(s) reconfigures into a non-heat transferring configuration when exposed to temperatures indicative of thermal runaway, the battery module can employ a lighter and/or less expensive exterior housing and still provide thermal isolation of the one or more battery cells in the event of thermal runaway.

Figure 1:
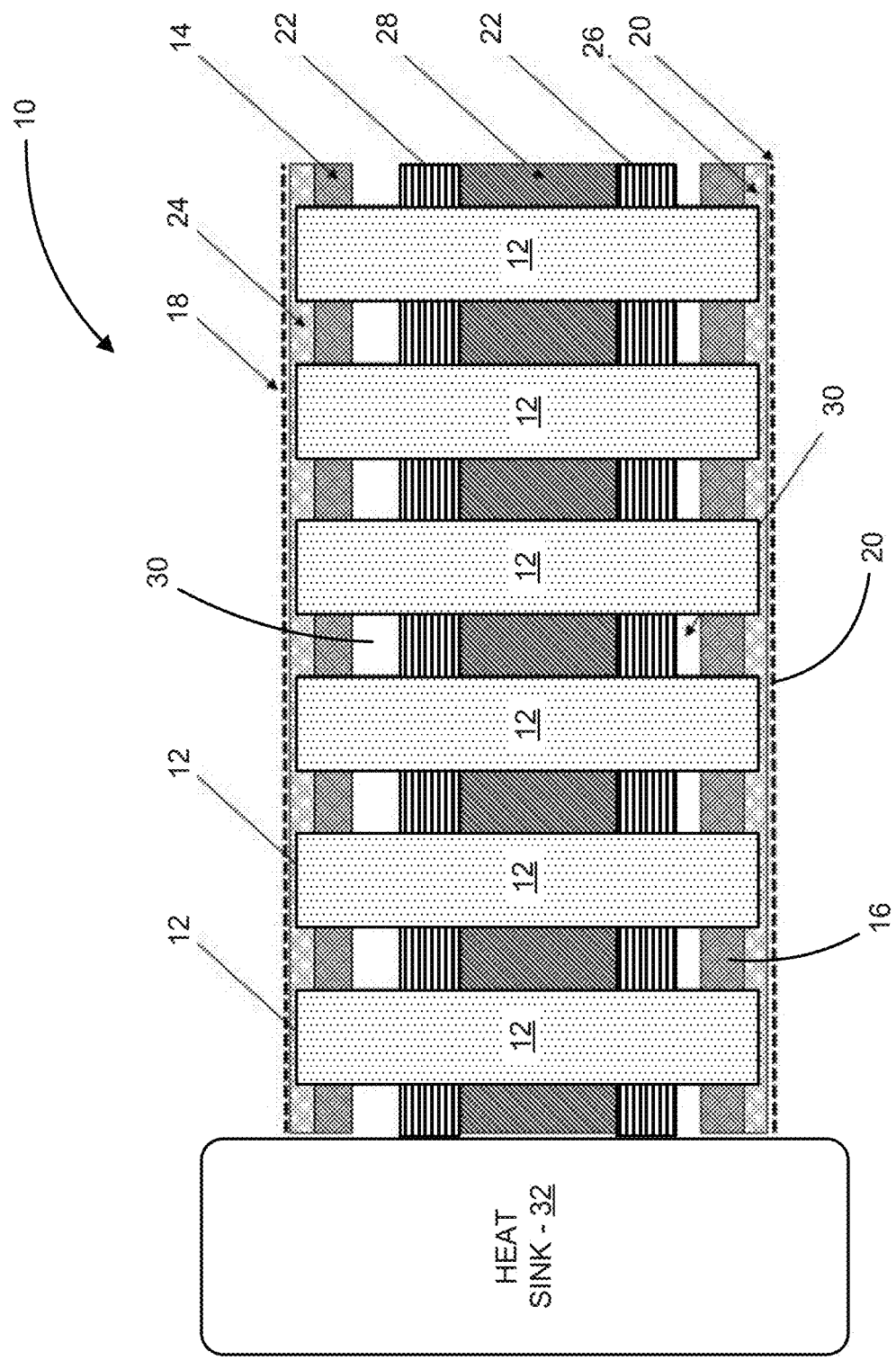
FIG. 1 is a simplified cross-sectional schematic diagram illustrating a battery module that includes laminated elements configured to passively manage heat generated by battery cells, in accordance with many embodiments.

Turning now to the drawing figures in which like reference numbers refer to like elements in the various figures, FIG. 1 shows a battery module 10 that is configured to passively manage heat generated by the battery module 10, in accordance with many embodiments. The battery module 10 includes an array battery cells 12, an upper cell holder 14, a lower cell holder 16, a cathode 18, an anode 20, laminated elements 22, a cathode intumescent coating 24 between the cathode 18 and the cathodes of the array of battery cells 12, an anode intumescent coating 26 between the anode 20 and the anodes of the array of battery cells 12, an optional expandable thermal felt insulation 28, and an optional wax/phase change material 30. In the illustrated embodiment, the upper and lower cell holders 14, 16 have apertures through which ends of the array of battery cells 12 extend and are held. The upper and lower cell holders 14, 16 can be made from any suitable material (e.g., polymeric, ceramic fiber board). The array of battery cells 12 extends through apertures in the laminated elements 22, the expandable thermal felt insulation 28, and, if included, through the wax/phase change material 30. In embodiments, the wax/phase change material 30 is configured to melt at a suitable temperature (e.g., 80 degrees Celsius).

The laminated elements 22 are initially configured to conduct heat away from one or more battery cells during normal operational conditions. During normal operating conditions, heat generated by each cell of the array of battery cells 12 is conducted away from cell by the laminated elements 22. In the illustrated embodiment, the laminated elements 22 contact each of the array of battery cells 12 and an external heat sink 32 so as to provide a heat conduction path from the array of battery cells 12 to the heat sink 32. Any suitable external heat sink 32 can be used. For example, the battery module 10 can include a thermally-conductive external housing that is thermally coupled with the laminated elements 22 so that heat generated by the battery cells 12 is transferred to the housing for subsequent transmission external to the housing.

The laminated elements 22 are further configured to reconfigure from the initial heat-conducting configuration to a non-heat conducting configuration when exposed to high temperature generated by one or more of the battery cells 12 during thermal runaway. As described herein in detail with reference to FIG. 2, each of the laminated elements 22 includes heat conducting layers and intumescent layers that reconfigure when exposed to an elevated temperature thereby reconfiguring the laminated element from the initial heat-conducting configuration to the non-heat conducting configuration. When in the non-heat conducting configuration, the laminated element 22 is configured to inhibit heat conduction thereby helping to thermally isolate any cell of the array of battery cells 12 experiencing thermal runaway.

In some instances, the laminated elements 22 will locally reconfigure from the initial heat-conducting configuration to the non-heat conducting configuration. For example, when only one of the cells of the array of battery cells 12 experiences a thermal runaway, a local portion of each of the laminated elements 22 adjacent to the where the laminated elements 22 contact the cell experiencing thermal runaway can reconfigure into the non-heat conducting configuration thereby thermally isolating the cell experiencing thermal runaway and stopping transfer of heat to the remaining portion of the laminated element 22 still in the initial heat-conducting configuration. Accordingly, the laminated elements 22 may function to thermally isolate only cells experiencing thermal runaway while still conducting heat away from cells not experiencing thermal runaway.

The cathode intumescent coating 24 between the cathode 18 and the cathodes of the array of battery cells 12 is initially configured to accommodate electrical conduction between the cathode 18 and respective cathodes of the array of battery cells 12. For example, in embodiments, contact areas of the respective cathodes of the battery cells 12 are masked prior to application of the cathode intumescent coating 24 so that the cathode 18 directly contacts the respective cathode contact areas. The cathode 18 can be made of any suitable electrically conducting material (e.g., nickel, copper). Upon exposure to a suitable temperature exceedance caused by a thermal runaway of one or more of the battery cells 12, the cathode intumescent coating 24 expands to induce separation between the cathode 18 and respective cathodes of battery cells of the array of battery cells 12 experiencing thermal runaway, thereby interrupting the electrical connection. Similar to the above-described local expansion of the laminated elements 22, the cathode intumescent coating 24 may partially expand immediately adjacent to the cathodes of the battery cells 12 experiencing thermal runaway and thereby only disconnect the cathode 18 from the battery cells 12 experiencing thermal runaway.

In a similar manner to the cathode intumescent coating 24, the anode intumescent coating 26 between the anode 20 and the anodes of the array of battery cells 12 is initially configured to accommodate electrical conduction between the anode 20 and respective anodes of the array of battery cells 12. For example, in embodiments, contact areas of the respective anodes of the battery cells 12 are masked prior to application of the anode intumescent coating 26 so that the anode 20 directly contacts the respective anode contact areas. The anode 20 can be made of any suitable electrically conducting material (e.g., nickel, copper). Upon exposure to a suitable temperature exceedance caused by a thermal runaway of one or more of the battery cells 12, the anode intumescent coating 26 expands to induce separation between the anode 20 and respective anodes of battery cells of the array of battery cells 12 experiencing thermal runaway, thereby interrupting the electrical connection. Similar to the above-described local expansion of the cathode intumescent coating 24, the anode intumescent coating 26 may partially expand immediately adjacent to the anodes of the battery cells 12 experiencing thermal runaway and thereby only disconnect the anode 20 from the battery cells 12 experiencing thermal runaway.

Figure 2:
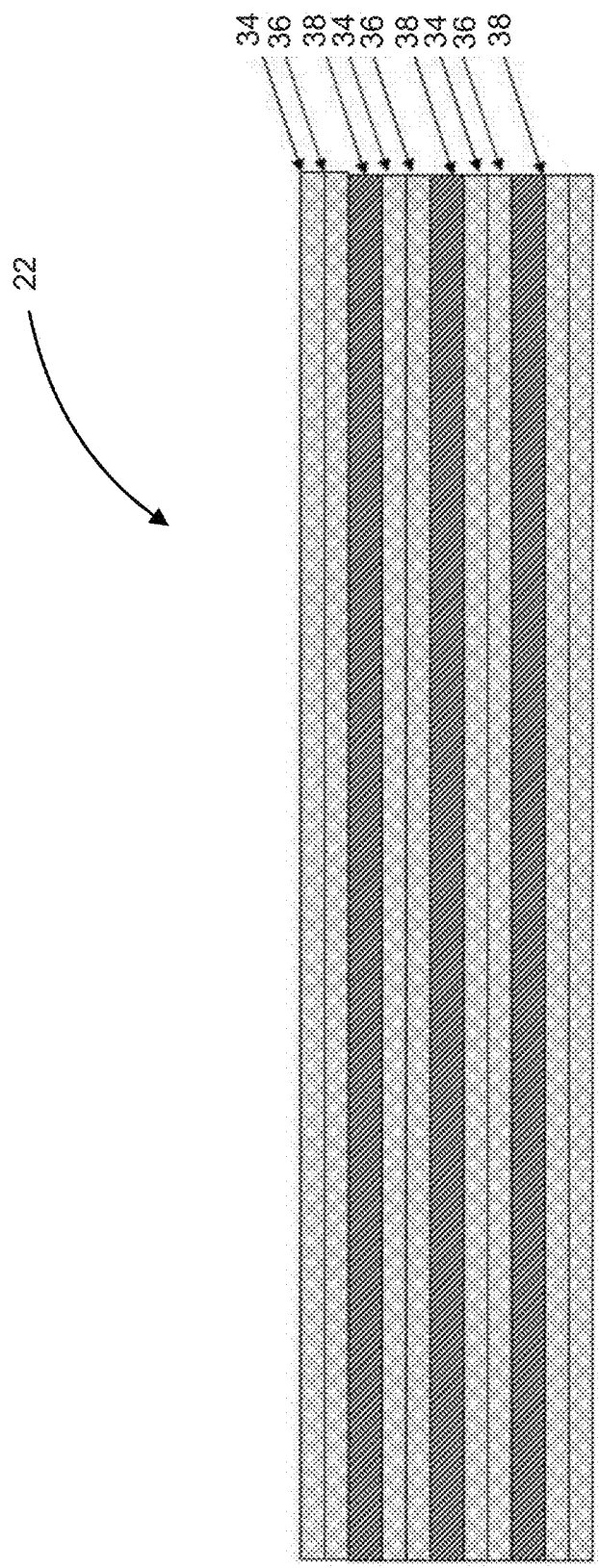
FIG. 2 is a simplified cross-sectional schematic diagram illustrating one of the laminated elements of the battery module of FIG. 1.

FIG. 2 illustrates an embodiment of the laminated element 22. In the illustrated embodiment, the laminated element 22 includes intumescent layers 34, support layers 36, and heat conducting layers 38. The intumescent layers 34 are configured to expand when subjected to a suitable temperature (e.g., 200 to 300 degrees Celsius) induced as a result of thermal runaway of one or more of the battery cells 12. The intumescent layers 34 can be made from any suitable intumescent material. For example, suitable intumescent materials include sodium silicate based materials, graphite based intumescent materials, carbon-rich polyhydric compounds with an acid release agent, amine or amide dehydration elements, and a blowing agent. The support layers 36 can include any suitable material/elements (e.g., wire mesh, carbon mesh, felt) to provide support to the intumescent layers 34 and the heat conducting layers 38 during normal operating conditions in which no thermal runaway of the battery cells 12 occurs.

The heat conducting layers 38 can be made from any suitable material that can be reconfigured when exposed to a temperature exceedance resulting from thermal runaway of one or more of the battery cells 12. For example, in embodiments, the heat conducting layers 38 include a heat conductive material (e.g., aluminum nitride, carbon black) suspended in a matrix material (e.g., a synthetic wax, polyethylene terephthalate (PET), low-density polyethylene (LDPE)) having a suitably low melting temperature (e.g., 80 to 120 degrees Celsius). During normal operating conditions (i.e., no thermal runaway in any of the battery cells 12), the heat conducting layers 38 conduct heat away from the battery cells (12). During thermal runaway of one or more of the battery cells 12, the matrix material melts first (e.g., at 80 to 120 degrees Celsius) thereby decreasing the heat conductivity of the heat conducting layers 38 and providing an initial level of thermal isolation of the one or more battery cells 12 experiencing thermal runaway.

With sufficient additional temperature exceedance (e.g., 200 to 300 degrees Celsius), the intumescent layers 34 expand to further decrease the heat conductivity of the heat conducting layers 38. The expansion of the intumescent layers 34 increases the insulating properties of the laminated element 22, thereby increasing the thermal isolation of the one or more battery cells 12 experiencing thermal runaway.

Any suitable approach can be used to fabricate the laminated element 22. For example, the heat conducting layer 38 can be formed via melting and roll forming or doctor blade. A laminated sheet can be formed that includes a heat conducting layer 38 and an intumescent layer 34. For example, an intumescent material can be sprayed onto a heat conducting layer 38. The laminated sheet can also be formed by bonding a sheet of intumescent material to a heat conducting layer 38 by elevating the temperature of the sheets close to the melting temperature of the heat conducting layer 38 and pressing the sheets together (e.g., using a roller) to bond the intumescent layer 24 and the heat conducting layer 38 together. The laminated element 22 can be formed by cutting and stacking the laminated sheets with alternating layers. The laminated element 22 can also be formed by spraying an intumescent material onto a heat conducting layer 38, adding another heat conducting layer 38 onto the sprayed intumescent layer and repeating any suitable number of times to incorporate the desired suitable number of heat conducting layers 38 separated by sprayed intumescent layers 34. The laminated element 22 can also be formed by positioning sheets of intumescent material in a tool with standoffs and use closed tool forming to create large bi-material sheets via injection. The large bi-material sheets can be trimmed and/or formed as desired using conventional machining approaches. Alternatively, the closed tool can be configured to form net shape laminated elements with or without all the holes through which the battery cells extend. One or more support layers 36 can be included using the same approaches.

Figure 3:
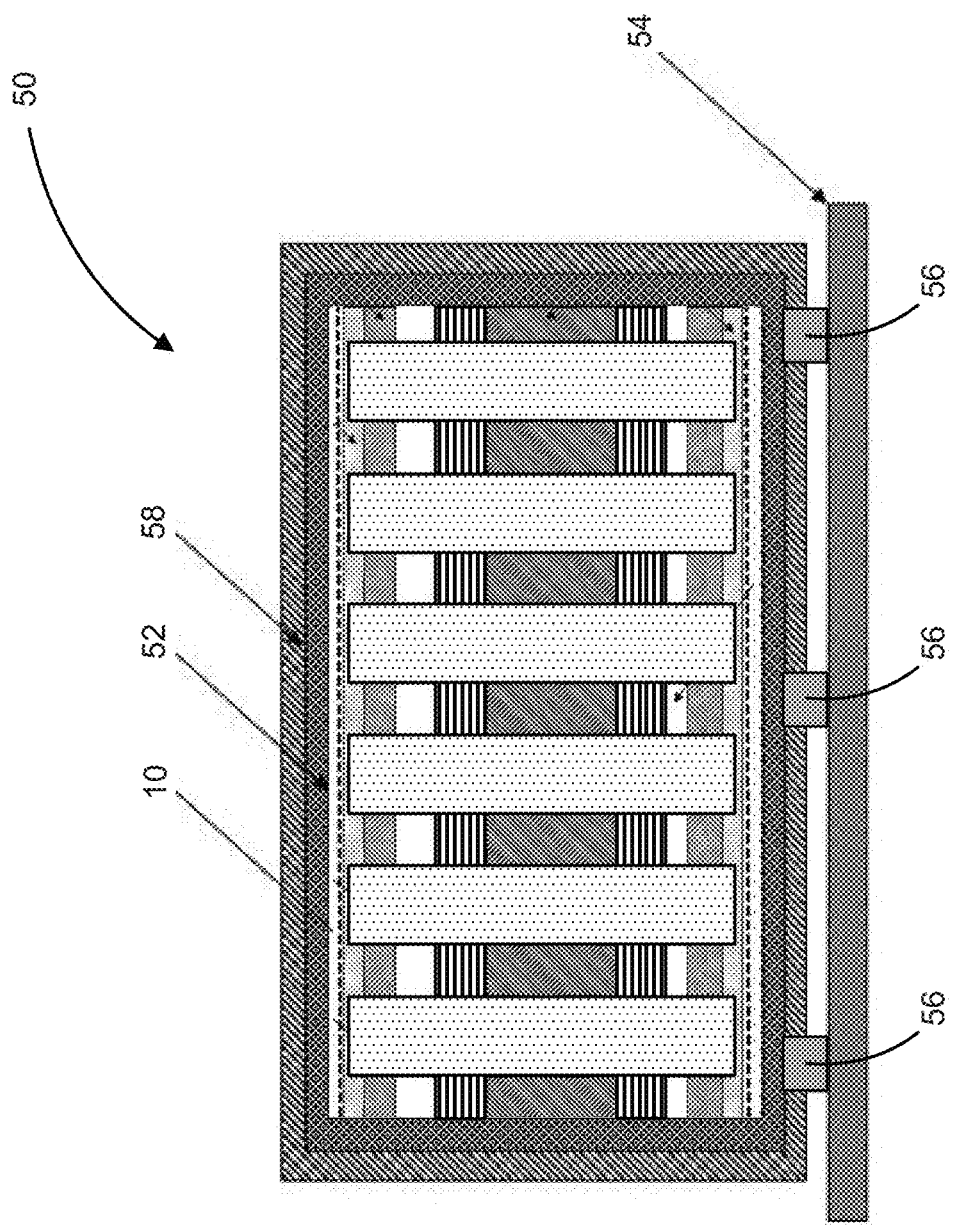
FIG. 3 is a simplified cross-sectional schematic diagram illustrating a battery that includes the battery module of FIG. 1.

The battery module 10 can be incorporated into any suitable battery. For example, FIG. 3 illustrates a battery 50 that includes the battery module 10. The battery 50 includes a thermally conductive housing 52 enclosing the battery module 10, an exterior heat sink 54, and thermally conductive stand-offs 56 thermally coupling the housing 52 to the heat sink 54. In the illustrated embodiment, the battery 50 further includes an optional exterior intumescent coating 58 configured to expand if the temperature of the housing 52 exceeds a suitable temperature (e.g., 200 to 300 degrees Celsius) to provide additional thermal isolation of the battery 50 in addition to the passive thermal isolation provided in the battery module 10 via the laminated elements 22, the cathode intumescent coating 24, and the anode intumescent coating 26 as described herein. The exterior heat sink 54 can be placed in a location suitable to dissipate heat from the exterior heat sink 54. For example, when the battery 50 is used to power a vehicle, the heat sink 54 can be located at an exterior surface of the vehicle to transfer heat from the heat sink 54 to the surrounding ambient environment.

Figure 4:
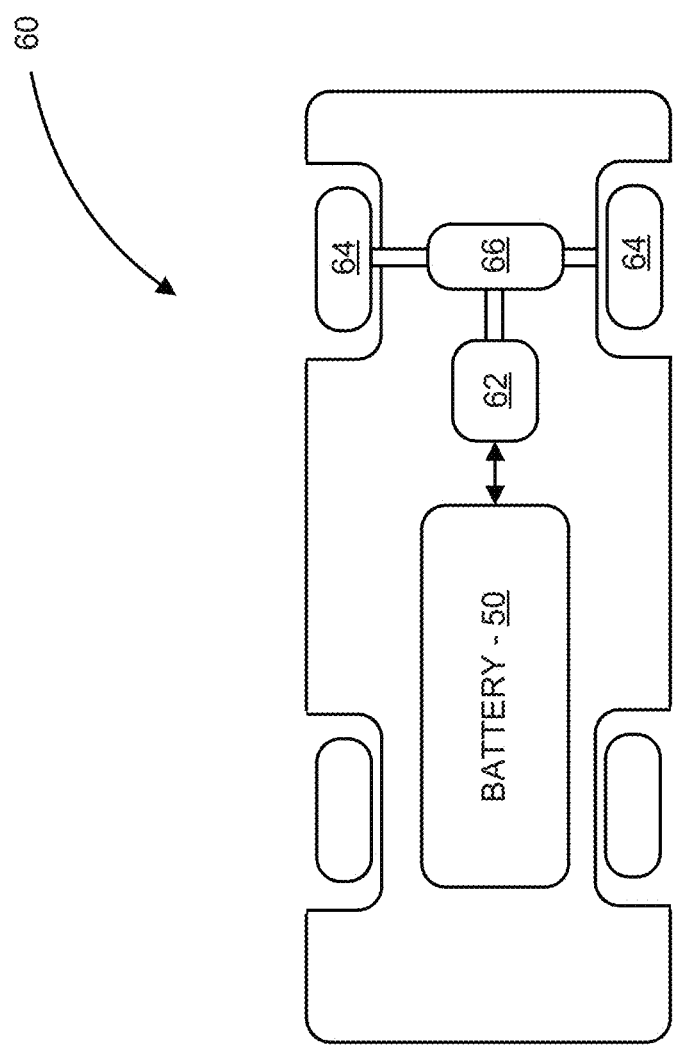
FIG. 4 is a simplified schematic diagram illustrating an electric vehicle that includes a battery module that includes laminated elements configured to passively manage heat generated by battery cells, in accordance with many embodiments.
Figure 5:
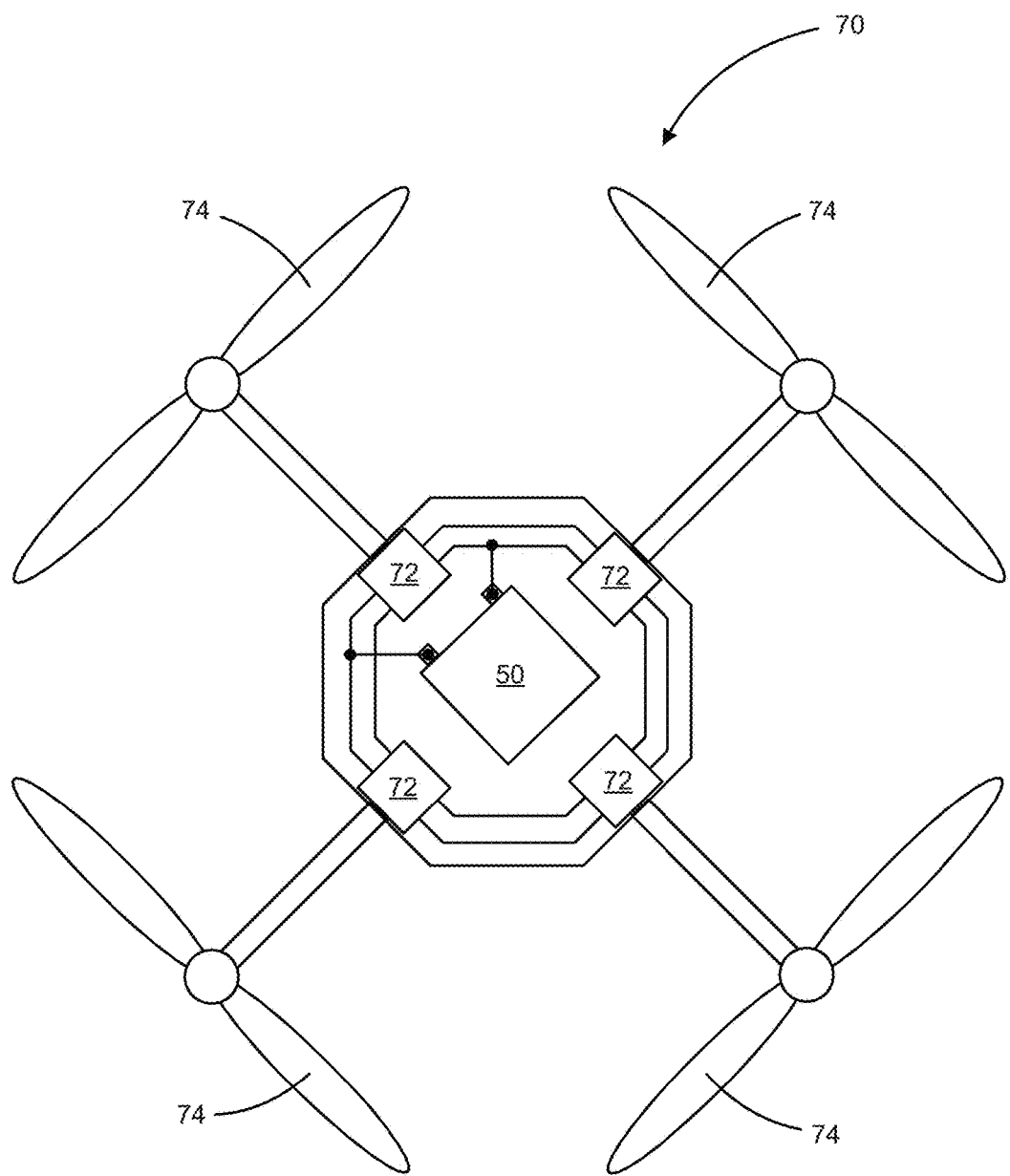
FIG. 5 is a simplified schematic diagram illustrating an air vehicle powered by a battery module that includes laminated elements configured to passively manage heat generated by battery cells, in accordance with many embodiments.
Figure 6:
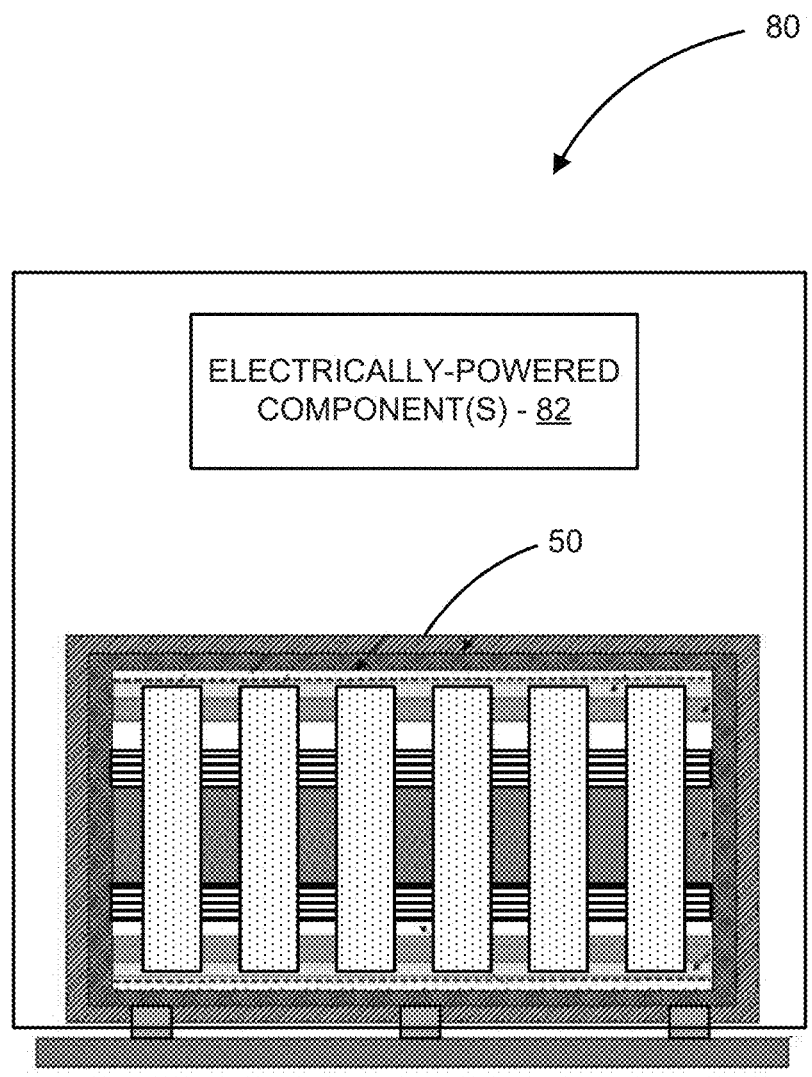
FIG. 6 is a simplified schematic diagram illustrating a portable electronic device powered by a battery module that includes laminated elements configured to passively manage heat generated by battery cells, in accordance with many embodiments.

The battery 50 can be used to power any suitable electrically powered item. For example, FIG. 4 is a simplified schematic diagram illustrating an electric car 60 that includes the battery module 50. The electric car 60 further includes an electric motor 62 that powers drive wheels 64 via a transmission 66. As described herein, the heat sink 54 of the battery 50 can be located at an external surface of the electric car 60 to transfer heat from the heat sink 54 to the surrounding environment during normal operating conditions. As another example, FIG. 5 is a simplified schematic diagram illustrating a remotely controlled drone 70 that includes the battery module 50. The drone 70 further includes electric motors 72 that power rotors 74. As described herein, the heat sink 54 of the battery 50 can be located at an external surface of the drone 70 to transfer heat from the heat sink 54 to the surrounding environment during normal operating conditions. As yet another example, FIG. 6 is a simplified schematic diagram illustrating an electronic device 80 that includes the battery 50. The electronic device 80 further includes one or more electrically powered components 82 powered by the battery 50. The electronic device 80 can be any suitable powered portable electronic device (e.g., laptop computer, cellular phone, fitness monitoring device, tablet, electronic book).

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A battery module comprising:
   an array of battery cells;
   a cell holder supporting the array of battery cells; and
   a laminated element contacted with each of the battery cells, wherein each of the battery cells extends through a respective aperture through the laminated element, the laminated element including heat conducting layers and intumescent layers interspersed with the heat conducting layers, the intumescent layers being configured to expand in response to an intumescent layer temperature exceedance to reconfigure the laminated element from a first configuration in which the laminated element transfers heat emitted by the array of battery cells to a second configuration in which the laminated element does not substantially transfer heat emitted by the array of battery cells.

2. The battery module of claim 1, wherein each of the heat conducting layers includes a heat conductive material suspended in a matrix material, the matrix material having a melting point temperature in a range from 80 to 120 degrees Celsius.

3. The battery module of claim 1, further comprising:
an anode intumescent layer configured to expand in response to an anode intumescent layer temperature exceedance to reconfigure the anode intumescent layer from a first configuration in which the anode intumescent layer permits current flow via anodes of the array of battery cells to a second configuration in which current flow via at least one anode of the array of battery cells is at least partially inhibited relative to current flow in the first configuration; and
a cathode intumescent layer configured to expand in response to a cathode intumescent temperature exceedance to reconfigure the cathode intumescent layer from a first configuration in which the cathode intumescent layer permits current flow via cathodes of the array of battery cells to a second configuration in which current flow via at least one of the array of battery cells is at least partially inhibited relative to current flow in the first configuration.

4. A battery module comprising:
a first battery cell; and
a laminated element including one or more heat conducting layers and one or more intumescent layers, the laminated element comprising an aperture through which the first battery cell extends and contacts the laminated element, the one or more intumescent layers being configured to expand in response to an intumescent layer temperature exceedance to reconfigure the laminated element from a first configuration in which the laminated element transfers heat emitted by the first battery cell to a second configuration in which the laminated element does not substantially transfer heat emitted by the first battery cell.

5. The battery module of claim 4, wherein at least one of the one or more heat conducting layers reconfigures from a heat-conducting configuration to a non-heat-conducting configuration, prior to expansion of the one or more intumescent layers, in response to a heat conducting layer temperature being within a transition temperature range for the heat conducting layer, the heat-conducting configuration transferring heat emitted by the first battery cell, and the non-heat-conducting configuration not substantially transferring heat emitted by the first battery cell.

6. The battery module of claim 5, wherein at least one of the one or more heat conducting layers includes a heat conductive material suspended in a matrix material that melts in response to the heat conducting layer temperature being within the transition temperature range for the heat conducting layer.

7. The battery module of claim 6, wherein the transition temperature range for the heat conducting layer is within a range from 80 to 120 degrees Celsius.

8. The battery module of claim 6, wherein:
the matrix material includes a synthetic wax; and
the heat conductive material includes at least one of aluminum nitride or carbon black.

9. The battery module of claim 4, wherein the first battery cell has a first battery cell anode and a first battery cell cathode, the battery module further comprising at least one of:
an anode intumescent layer configured to expand in response to an anode intumescent layer temperature being within a transition temperature range for the anode intumescent layer to reconfigure the anode intumescent layer from a first configuration in which the anode intumescent layer permits current flow via the first battery cell anode to a second configuration in which current flow via the first battery cell anode is at least partially inhibited relative to current flow in the first configuration; or
a cathode intumescent layer configured to expand in response to a cathode intumescent temperature being within a transition temperature range for the cathode intumescent layer to reconfigure the cathode intumescent layer from a first configuration in which the cathode intumescent layer permits current flow via the first battery cell cathode to a second configuration in which current flow via the first battery cell cathode is at least partially inhibited relative to current flow in the first configuration.

10. The battery module of claim 4, further comprising a second battery cell, and wherein the laminated element is configured to transfer heat emitted by the second battery cell when the laminated element is in the first configuration and does not substantially transfer heat emitted by the second battery cell when the laminated element is in the second configuration.

11. The battery module of claim 10, wherein each of the first and second battery cells extends at least partially through a respective aperture through the laminated element.

12. The battery module of claim 11, further comprising a second laminated element, and wherein each of the first and second battery cells extends at least partially through a respective aperture through the second laminated element.

13. The battery module of claim 4, wherein the laminated element includes a plurality of laminated subassemblies, each of the laminated subassemblies including one of the heat conducting layers and one of the intumescent layers.

14. The battery module of claim 13, wherein at least one of the laminated subassemblies includes a support layer that includes at least one of a wire mesh or a carbon mesh.

15. The battery module of claim 4, further comprising a thermally conductive housing enclosing the first battery cell and the laminated element, the thermally conductive housing being coupled with the laminated element when the laminated element is in the first configuration to transfer heat from the laminated element.

16. The battery module of claim 15, further comprising a heat sink element thermally coupled with the thermally conductive housing via one or more thermally conductive standoff members.

17. A laminated structure for passive management of heat generated by a battery, the laminated structure comprising one or more heat conductive layers and one or more intumescent layers interspersed with the one or more heat conductive layers, each of the one or more intumescent layers being configured to expand in response to an intumescent layer temperature exceedance to reconfigure the laminated structure from a first configuration in which the laminated structure is heat conductive to a second configuration in which the laminated structure is not substantially heat conductive, the laminated structure comprising an aperture through which the battery extends and contacts the laminated structure.

18. The laminated structure of claim 17, further comprising one or more support layers interspersed with the one or more heat conductive layers and the one or more intumescent layers, each of the support layers comprising a reinforcing mesh.

19. The laminated structure of claim 17, wherein at least one of the one or more heat conductive layers reconfigures from a heat-conducting configuration to a non-heat-conducting configuration in response to a heat conducting layer temperature being within a transition temperature range for the heat conductive layer, the heat-conducting configuration transferring heat emitted by the battery, and the non-heat-conducting configuration not substantially transferring heat emitted by the battery.

\* \* \* \* \*